R. J. PRINS.
HANDLE.
APPLICATION FILED JUNE 25, 1909.
1,022,380.
Patented Apr. 2, 1912.
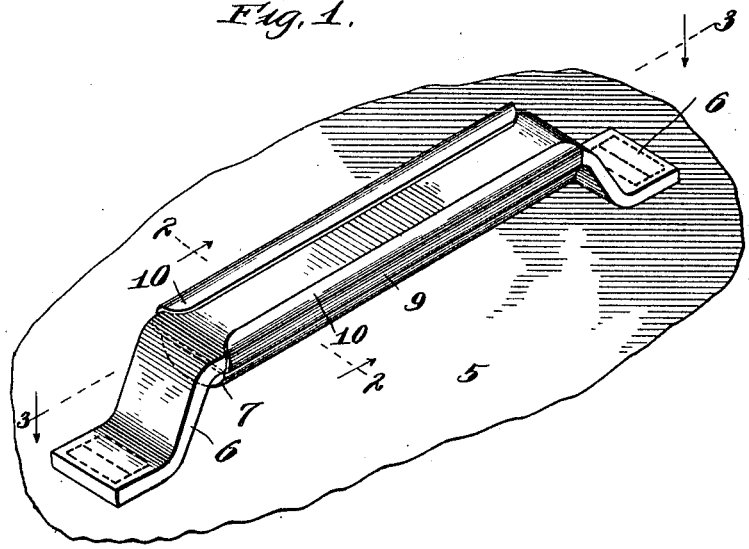
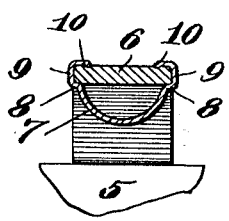
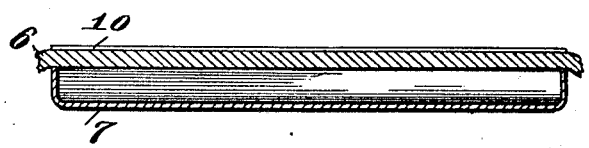
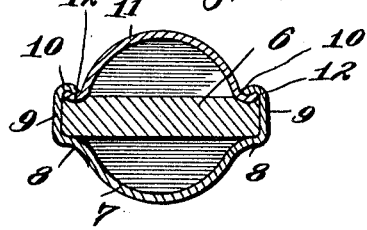
Witnesses:
G. A. Paubuschmidt
Margaret Gorman
Inventor:
Raphael J. Prins
By Coburn & McRoberts
his Attys.
COLUMBIA PLANOGRAPH CO., WASHINGTON, D. C.

UNITED STATES PATENT OFFICE.

RAPHAEL J. PRINS, OF CHICAGO, ILLINOIS.

HANDLE.

1,022,380.  Specification of Letters Patent.  Patented Apr. 2, 1912.

Application filed June 25, 1909. Serial No. 504,241.

*To all whom it may concern:*

Be it known that I, RAPHAEL J. PRINS, a citizen of the United States, residing at Chicago, in the county of Cook and State of Illinois, have invented certain new and useful Improvements in Handles, of which the following is a specification, reference being had therein to the accompanying drawing.

My invention relates to handles for boxes, carrying-cases, etc., and the special object of the invention is to provide a handle for devices of this general character having a grip portion shaped in general to conform to the outline of the carrier's hand when holding the handle and which prevents the edges of the handle from cutting the hand of the carrier.

With this object in view the invention consists in the matters hereinafter described and then pointed out in the appended claim.

In the accompanying drawings which illustrate my invention, Figure 1 is a perspective view of my improved handle applied to a portion of a sample box or case to which it is secured; Fig. 2 is a cross sectional view on the line 2—2 of Fig. 1; Fig. 3 is a longitudinal sectional view on the line 3—3 of Fig. 1, and Fig. 4 is a cross sectional view showing a modification.

In the drawings the reference numeral 5 indicates the top or body of a suitable box, carrying-case, or valise to which the usual handle 6 is secured in any suitable manner, this handle being composed of any suitable material and preferably of a strip of flexible material such as leather.

The grip portion of the handle is composed of a rounded body 7 shaped in general cross sectional contour to correspond to the curve of the hand of a person carrying the bag or box, and extending lengthwise of the handle 6 sufficiently to make an extended grip to accommodate the hand of the user. The body is provided with lateral longitudinal recesses or channels which receive and retain the edges of the handle 6 and into which the edges of the handle are slipped or drawn in assembling the grip upon the handle before the latter is secured to the case or box. The lateral recesses may be provided in any suitable manner and as shown in the drawings the body 7 is of slightly less width than the handle 6 so that it forms substantially horizontal faces 8 which rest in contact with the lower surface of the handle 6, the material of the grip then leading upward from the horizontal faces as at 9 around the edges of the handle as at 10, the edges 10 of the grip being preferably inturned or bent down so that the material of the handle 6 is slightly compressed or clamped between the faces 8 and the ends 10.

The grip portion may be constructed of any suitable material as for example it may be a suitable composition molded or pressed to form or it may be and preferably is of light sheet metal. The handle or grip is assembled by passing an end of the strip into one end of the longitudinal recess of the grip and drawing the strip to position along and through the channels until the grip is in its proper place upon the handle, the space between the faces 8 and ends 10 forming the recesses being preferably sufficiently restricted or narrower than the thickness of the strip so as to cause the grip to bind up the strip with sufficient force to prevent its accidental movement along the strip but not to prevent the ready assembling of these parts as above described.

In Fig. 4 I have shown a modification in which a grip substantially circular in cross section is provided with a supplemental top piece 11 which is bulged or rounded in substantial conformity with the body 7 and is provided with lateral wings 12 adapted to pass below or under the inturned ends 10 of the body 7. This supplemental piece forms a finish for the grip and also provides a substantially round grip.

I claim:—

In a device of the class described, a handle comprising a suitable strip of material fastened at its ends to a box or bag, and a grip consisting of a rounded body to underlie the strip and having lateral longitudinal recesses to grip the edges of the strip, and a rounded supplemental top piece to overlie the strip and having lateral wings in the recesses.

In testimony whereof I affix my signature in presence of two witnesses.

RAPHAEL J. PRINS.

Witnesses:
  MARGARET GORMAN,
  J. MCROBERTS.

Copies of this patent may be obtained for five cents each, by addressing the "Commissioner of Patents, Washington, D. C."